US010382560B2

(12) United States Patent
Hopkins

(10) Patent No.: US 10,382,560 B2
(45) Date of Patent: Aug. 13, 2019

(54) CONTROLLING DISTRIBUTION OF CONTENT WITHIN A VEHICLE

(71) Applicant: GM GLOBAL TECHNOLOGY OPERATIONS LLC, Detroit, MI (US)

(72) Inventor: Jason Hopkins, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/794,360

(22) Filed: Oct. 26, 2017

(65) Prior Publication Data

US 2019/0132395 A1 May 2, 2019

(51) Int. Cl.
| G06F 7/00 | (2006.01) |
| H04L 29/08 | (2006.01) |
| B60K 35/00 | (2006.01) |
| H04W 4/04 | (2009.01) |
| H04W 4/80 | (2018.01) |
| G08G 1/123 | (2006.01) |
| G09G 5/00 | (2006.01) |
| H04M 3/00 | (2006.01) |

(52) U.S. Cl.
CPC ............ *H04L 67/125* (2013.01); *B60K 35/00* (2013.01); *H04L 67/10* (2013.01); *H04W 4/04* (2013.01); *H04W 4/80* (2018.02)

(58) Field of Classification Search
CPC ........ H04L 67/125; H04L 37/10; H04W 4/80; H04W 4/04; H04W 4/005; H04W 4/046; H04W 4/4008; B60K 35/00; G01C 21/3664; G06F 3/1454
USPC ...................... 701/36, 532; 345/3.1; 455/420
See application file for complete search history.

(56) References Cited

U.S. PATENT DOCUMENTS

| 2014/0078022 A1* | 3/2014 | Dusterhoff ............ G06F 3/1423 345/3.1 |
| 2015/0373479 A1* | 12/2015 | Xia ......................... H04W 4/70 455/420 |
| 2017/0015260 A1* | 1/2017 | Mack .................... G02B 27/017 |
| 2017/0313426 A1* | 11/2017 | Morin ................ B64D 11/0015 |

* cited by examiner

Primary Examiner — Mahmoud S Ismail
(74) Attorney, Agent, or Firm — Reising Ethington P.C.; David Willoughby

(57) ABSTRACT

A system and method for displaying content from mobile devices on a plurality of displays in a vehicle are disclosed. Example methods may include receiving content from a first mobile device at a vehicle, and displaying the content on a plurality of displays installed in the vehicle, thereby forming a connected display area amongst the plurality of displays. In some example methods, additional content is received from a second mobile device. An example vehicle may include a plurality of displays and a telematics unit in communication with each of the displays. The telematics unit may be configured to share content received from one or more mobile devices on the plurality of displays, thereby providing a connected display area.

13 Claims, 3 Drawing Sheets

CONTROLLING DISTRIBUTION OF CONTENT WITHIN A VEHICLE

INTRODUCTION

The present invention relates to vehicle infotainment systems and methods for using the same, and more particularly to infotainment systems used as a mobile office.

Infotainment systems generally provide displays and sound systems that allow passengers to consume media, e.g., by playing music, movies, or the like. More recently, infotainment systems have employed cellular data systems of the vehicle to download content such as music, shows, and movies for passenger entertainment.

While some vehicle data systems now allow vehicle occupants to remain connected with others outside the vehicle while traveling, e.g., by allowing access to the Internet, telephone calls, or the like, at present very limited control of the infotainment system from external devices, such as mobile devices, is allowed. More specifically, mobile devices typically may communicate wirelessly or otherwise with vehicle infotainment systems to provide content for consumption via the infotainment system (merely as examples, playing music or movies stored on or streamed from the mobile device). However, known infotainment systems typically do not allow control of the infotainment system via the mobile device(s), and in any case known systems do not permit the mobile device(s) to control content being provided by way of the vehicle displays.

SUMMARY

In accordance with one aspect of the invention, there is provided a method of controlling the distribution within a vehicle of content that is received from one or more mobile devices in the vehicle. Example methods may include receiving content at the vehicle from a first mobile device located at the vehicle. The content includes screen content for display by one or more display screens, and the content is received by the vehicle under control of an application executing on the first mobile device. The method may further include distributing the content within the vehicle to at least one of the displays installed in the vehicle, with the distribution of the content to the selected one or more displays is carried out in response to a user selection input.

Optionally, a method may include dividing or splitting the screen content into two or more portions that are each sent to separate ones of the displays in the vehicle, thereby together forming an extended display area among the separate displays.

In at least some examples, the content may be displayed via a telematics unit installed to the vehicle.

Example displays may be selectively removable from the vehicle. In another example, at least one of the displays is permanently installed in the vehicle. In some approaches, the displays may be configured to communicate wirelessly with the mobile device and/or the telematics unit of the vehicle.

In some examples, additional content may be received from a second mobile device. The additional content received from the second mobile device may include a representation of a physical movement of the second mobile device. In at least some examples, the representation of the physical movement of the second mobile device may be displayed on at least one of the displays.

In accordance with another aspect of the invention, there is provided a vehicle comprising a plurality of displays installed in the vehicle, and a telematics unit installed to the vehicle. The telematics unit may be in communication with each of the displays. The telematics unit may also be configured to distribute content received from one or more mobile devices on the plurality of displays in response to a user selection input, thereby providing a connected display area amongst the plurality of displays.

Optionally, at least one of the displays is selectively removable from the vehicle. In another example, at least one of the displays is permanently installed in the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example illustrations are provided below of a vehicle and associated methods that generally provide a mobile office environment for vehicle occupants. Displays or other components of the mobile office may be installed into the vehicle, or otherwise integrated within the vehicle interior. At the same time, examples provided below allow use of portable electronic devices such as smartphones, laptop computers, or the like with the vehicle-installed components. An application downloaded or installed to the portable electronic device may allow control of the vehicle-installed components. Additionally, the application may facilitate integration of the portable electronic device with the vehicle-installed components, thereby enhancing the capabilities of the mobile devices within the vehicle environment. Such integration may allow sharing of programs, applications, or content by the mobile device with one or more displays or screens in a vehicle. By contrast, previous approaches generally have relied upon standardized connections or links to a single vehicle screen, e.g., by way of an HDMI cable, Bluetooth connection, or the like, which generally do not facilitate use of the displays. Accordingly, in the previous approaches, use of the mobile devices has been limited in the vehicle environment, particularly where the mobile device has a comparatively small display.

Communications System

Figure 1:
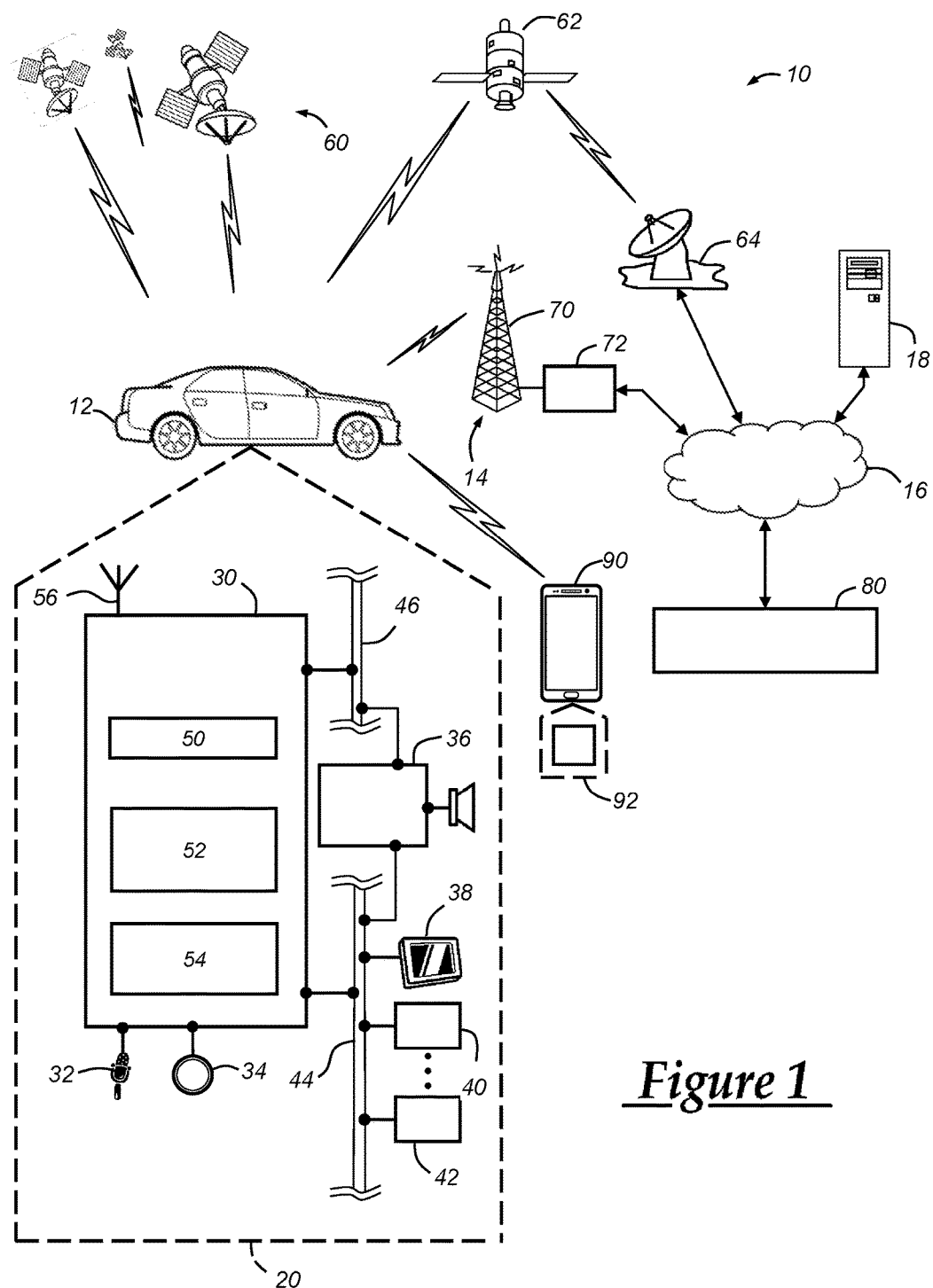
FIG. 1 is a block diagram depicting an embodiment of a communications system that is capable of utilizing the exemplary methods disclosed herein.

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a telematics unit 30, a microphone 32, one or more pushbuttons or other control inputs 34, an audio system 36, a visual display 38, a GPS module 40, a cruise control system 100, as well as a number of other vehicle system modules (VSMs) 42. Some of these devices can be connected directly to the telematics unit such as, for example, microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art, or via other wireless communication methods, e.g., SMS/text messages. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 30 utilizes cellular communication according to GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 18, for other purposes, such as fleet management. Also, new or updated map data can be downloaded to the GPS module 40 from the remote facility 80 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the remote facility 80. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 80. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 18 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 16. A database at the remote facility can store account information such as subscriber authentication information, vehicle identifiers, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle device, meaning that it is not a part of vehicle 12 or vehicle electronics 20. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application 92 that can allow a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. Wireless device 90 is shown as a smartphone having cellular telephone capabilities. In other embodiments, device 90 may be a tablet, laptop computer, or any other suitable device. In addition, application 92 may also allow the user to connect with the remote facility 80 or call center advisors at any time.

The application 92 may also be used to enable the user of device 90 to view information pertaining to the vehicle (e.g., the current location of the vehicle, whether the vehicle is locked or unlocked) and/or pertaining to an account associated with the user or vehicle. Moreover, as will be described further below, in some example approaches the application 92 may facilitate control of the display 38, thereby permitting the mobile device 90 to make use of the display 38 as a primary or auxiliary display with respect to the mobile device 90.

While a single display 38 is illustrated in FIG. 1, in the exemplary systems and methods described below it should be understood that multiple screens 38 may be present. In one example, a plurality of displays 38 may be provided in vehicle 12 which provide an extended display area for use by one or more mobile devices 90. Accordingly, the mobile device(s) 90 may communicate with the displays 38 to allow use of one or more of the display(s) 38 as an auxiliary display area or an extension of a display area of one or more of the mobile device(s) 90. The application 92 may facilitate use of the multiple displays 38 in the vehicle.

Figure 2:
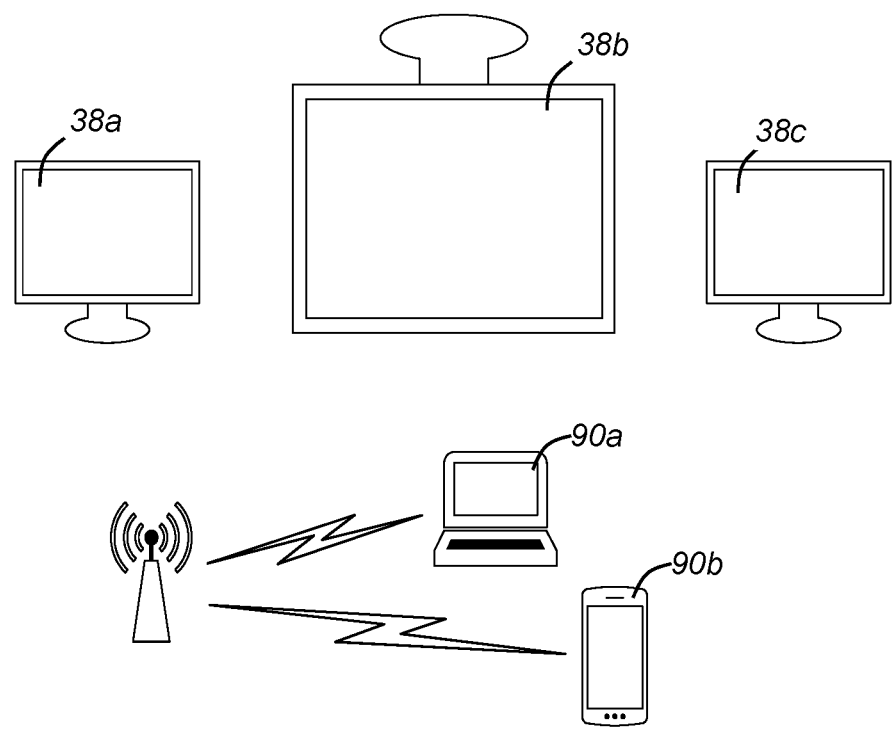
FIG. 2 is a schematic illustration of an embodiment of the communications system of FIG. 1, including a plurality of vehicle displays.

Turning now to FIG. 2, in one example illustration the vehicle 12 includes displays 38a, 38b, and 38c (collectively, 38). Each of the displays 38 are installed to the vehicle 12, e.g., as illustrated in FIG. 1, and therefore in communication with the telematics unit 30. Moreover, one or more mobile devices 90a, 90b (collectively, 90) may connect to the vehicle by way of antenna 56, as noted above. Merely by way of examples, the mobile devices 90 may connect to the vehicle 12 wirelessly, e.g., via Bluetooth or WiFi, or via wired connections such as a cable using a component video, audio, or high-definition multimedia interface (HDMI) connection.

The mobile devices 90a and 90b may also utilize a vehicle network(s) or connection(s) to connect or communicate with each other. For example, a first mobile device, e.g., smartphone 90b, may connect to the vehicle 12 via a Bluetooth connection. The smartphone 90b may utilize a WiFi network of the vehicle 12, using the same to connect to a second mobile device, e.g., laptop computer 90a. Moreover, while the displays 38a, 38b, 38c may be hardwired to components of the vehicle 12 (such as the telematics unit 30) to facilitate communication with a mobile device, the displays 38a, 38b, 38c may alternatively connect wirelessly, e.g., via the same WiFi network of the vehicle, with one or more of the mobile devices 90a, 90b. The mobile device(s) 90 may thereby share or project applications, programs, or the like running on the mobile device(s) 90 with the display(s) 38. To the extent the devices are connected with the vehicle over a vehicle WiFi network, the vehicle WiFi network may function as a single data communication network for the various devices.

The mobile device(s) 90 may thereby communicate with components of the vehicle 12 such as the displays 38, e.g., via the telematics unit 30. Moreover, in some examples the application 92 of the mobile device(s) 90 may control one or more of the displays 38. Merely as one example, as noted above the application 92 may facilitate usage of one or more of the displays 38 as an auxiliary screen or display area for the mobile device 90. A user may thereby view items displayed by the mobile device 90 on the display(s) 38, which may make viewing or working with those items, e.g., documents, while inside the vehicle 12. In some examples, the display(s) 38 may be relatively larger, and at least selectively fixed inside the vehicle 12, thereby permitting the user to more easily perform tasks via the mobile device 90 by using the display(s) 38 to display documents, spreadsheets, web pages, communications, etc.

The display(s) 38 may, in some examples, be installed to the vehicle 12. For example, the display(s) 38 may be installed in a headliner or roof area of the vehicle 12 via a mechanism that allows the display(s) 38 to be stowed when not in use. In another example approach, display(s) 38 may be installed to a vehicle headrest with a selectively removable mechanism. In this manner, the display(s) 38 may be viewed while secured in the headrest, or may be removed and held by a user. Moreover, such a display 38 may be portable, such that the user may take the display(s) 38 with them upon exiting the vehicle. In one illustration, display 38*b* is installed generally permanently in a headliner or roof (not shown) of the vehicle 12, while the displays 38*a* and 38*c* are installed to the front driver and front passenger headrests (not shown), respectively. The displays 38*a*, 38*c* may be selectively removable for portable use by the user, as described above.

The application 92 may also facilitate interaction with one or more of the displays 38 by the mobile device 90. In one example, while the mobile device 90 uses one or more of the display(s) 38 as a display area, the mobile device 90 may be used as a mouse to select, highlight, or otherwise interact with objects shown on the display(s) 38. Moreover, where multiple mobile devices 90 are present, a smaller mobile device, such as a smartphone 90*b*, may be used as a mouse. Continuing with this example, a larger mobile device 90*a*, e.g., a laptop computer, may utilize the display(s) 38 as primary or auxiliary screens. In this manner, using the devices 90*a*, 90*b* while traveling in the vehicle 12 may be made easier both by spreading the display area to relatively larger and/or more stable displays 38, and by allowing use of a relatively small mobile device 90*b* as a mouse.

The vehicle telematics unit 30 and/or an infotainment module thereof may be in communication with the display(s) 38, and may communicate with the mobile device(s) 90 and/or application 92 to facilitate display of content from the mobile device(s) 90. The telematics unit 30, for example, may receive screen content mobile device(s) 90, and send it to the display(s) 38. The telematics unit 30 may also have software stored on a non-transitory read-only memory (as may the mobile device(s) 90) to interface with the application 92 to automatically split the screen content into different portions for selected displays 38*a*, 38*b*, and/or 38*c* in the vehicle. Moreover, the telematics unit may receive user inputs to control dividing the screen content, e.g., by way of the display(s) 38, control input(s) 34, or the like.

In some example approaches, a mounting tray (not shown) or space may be provided for securing a mobile device 90 while the vehicle is moving. This feature may be particularly useful for larger mobile devices such as a laptop computer or tablet device. Additionally, one or more peripheral devices such as a keyboard, camera, mouse, or the like may be installed to the vehicle to allow control of a mobile device 90.

Generally, application 92 may allow mobile device(s) 90 to interface seamlessly with vehicle-installed components, e.g., the displays 38. The integration of multiple displays with the device may generally allow the displays 38 to be utilized to greater effect by one or more mobile devices 90. Programs or applications run on the mobile device 90 may thereby be displayed on the display(s) 38, permitting easier viewing and utilization of the mobile device 90 while traveling or otherwise in the vehicle 12. Display(s) 38 may thereby function as a "shared screen" of the mobile device(s) 90, e.g., to display video calls, applications or programs running on the mobile device(s) 90, etc.

The application 92 may facilitate sending of content on the mobile device 90 to the vehicle or components thereof. For example, a file, document, video, conference call, or the like, or any combination thereof, may be displayed on one or more of the vehicle displays 38. In some examples, content received at the vehicle from mobile device 90 includes screen content for display on one or more of the displays 38.

The application 92 may facilitate display of multiple types of content, e.g., by allowing a user of the mobile device 90 to select certain content to be displayed on particular screens 38. In this manner, screen content from the mobile device 90 may be split into two or more portions, which each sent to separate ones of the displays 38. The display(s) 38 may thereby together form an extended display area among the separate displays.

Merely by way of example, a user may select a relatively larger display 38*b* for displaying a presentation, document, or the like, while selecting a relatively smaller or secondary display 38*a* or 38*c* for displaying a video conference feed. The application 92 may receive selections from a user to indicate which display(s) 38 should receive particular portions of the content being sent to the displays 38.

In another example, a user interface of the vehicle may be used to control content received from the mobile device 90 and/or application 92. More specifically, the display 38*b* may be a touchscreen configured to receive inputs from a user to indicate which of the display(s) 38*a*, 38*b*, and/or 38*c* may receive particular portions of the content provided by the mobile device 90 to the displays. Continuing with this example, a user may select display 38*c* to display a supporting document saved on the mobile device 90, while the user selects the relatively larger display 38*b* for displaying another document, spreadsheet, or the like which the user is actively modifying or drafting.

By contrast, in previous approaches vehicle hardware or software generally prevents or locks out access by mobile devices, at least preventing the mobile device(s) from accessing more than one screen simultaneously. More specifically, while in previous approaches mobile devices may be permitted to connect directly to a single display, the connection typically would only permit playback of media content, e.g., a movie or television show, directly from the device. In any case, in these previous approaches, a mobile device could not utilize the vehicle display as an auxiliary display for applications run on the mobile device.

Method

Figure 3:
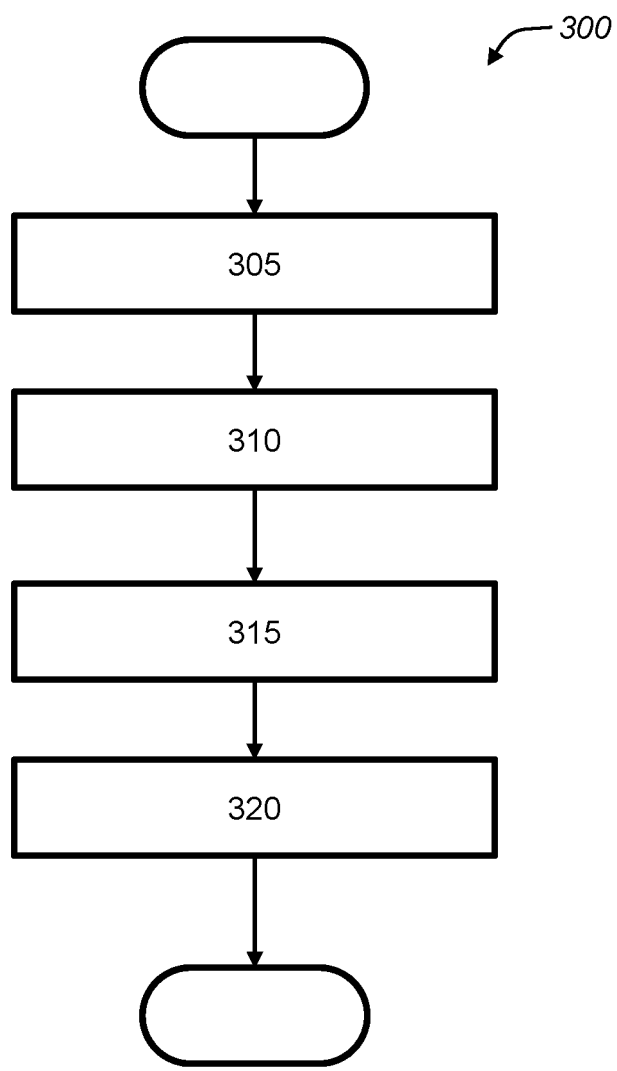
FIG. 3 is a process flow diagram illustrating exemplary methods of communicating with one or more vehicles.

Turning now to FIG. 3, a process flow diagram is illustrated representing example methods of displaying content from one or more mobile devices in a vehicle. Process 300 may begin at block 305, where content is received from a first mobile device at a vehicle. As noted above, content may take the form of media being played by a mobile device, e.g., mobile device 90*b*, such as music or movies. In other example approaches, content may include a program supported by the mobile device 90*b*. In one example, mobile device 90*b* may be a laptop computer running a word processing program, spreadsheet or database program, or the like. The content may include screen content for display by one or more display screens, e.g., displays 38. The screen content may be received by the vehicle under control of, for example, application 92 on the mobile device 90. Process 300 may then proceed to block 310.

At block 310, received screen content may be distributed within the vehicle to at least one of the displays installed in the vehicle. For example, as noted above screen content of the mobile device 90 may be divided or apportioned amongst multiple displays 38. The distribution of the screen content to the selected one or more displays may be carried out in response to a user selection input, e.g., as received on the application 92 of the mobile device, or a user input device of the vehicle, e.g., display(s) 38, control inputs 34, or the like. The screen content may thus be split into two or more portions that are each sent to separate displays, e.g., display 38*a* and display 38*b*, thereby together forming an extended display area among the separate displays. As such, the screen content received at block 305 may be displayed on a plurality of displays installed in the vehicle, to form a connected or extended display area amongst the plurality of displays. In other words, a plurality of displays, e.g., displays 38a, 38b, and/or 38c, may be employed to display the divided content of the mobile device(s) 90. In this manner, the mobile device 90b may "move" objects, applications, or the like from one of the displays to another of the displays. The displays 38a, 38b, 38c may be linked positionally, such that movement of an object "off" of a first one of the displays (e.g., display 38a) resulted in the object being moved to the next adjacent display (e.g., display 38c) at a vertical or horizontal position similar to that of the object where the object "left" the first display. Content received from the first mobile device may provided via an application stored on the first mobile device, e.g., application 92. Content from the mobile device 90 may be provided via a wired or wireless connection from the mobile device 90, or may be transmitted via telematics unit 30, as noted above.

Proceeding to block 315, additional content may be received from a second mobile device. The content received from the second mobile device may include content of a similar type noted above with respect to the first mobile device, e.g., media, applications and associated data. Alternatively, the content received may be of a different type, and may represent a control or manipulation of the content of the first mobile device. For example, as noted above a second mobile device, e.g., mobile device 90a, may be utilized as a mouse that is displayed on one or more of the displays 38. The content may thus include a representation of a physical movement of the second mobile device, e.g., by displaying a cursor or other indicator on the display(s) 38 that moves in response to physical movement of the mobile device 90a. In such examples, the mobile device 90a may include hardware or software for detecting position and/or movement of the mobile device 90a, e.g., accelerometers, optical sensors, etc. Process 300 may then proceed to block 320.

At block 320, the content of the second mobile device may be displayed on one or more of the displays. Merely as one example, where the content of the second mobile device 90a includes a representation of physical movement of the second mobile device 90a, the movement may be shown on at least one of the displays by way of a moving cursor or the like. Process 300 may then terminate.

The above examples may facilitate usage of vehicle 12 as a mobile office by enabling use of mobile device(s) 90 more effectively by passengers within the vehicle environment. Moreover, where the vehicle 12 is an autonomous or semi-autonomous vehicle, one or more displays 38 may be positioned for use by the driver during autonomous driving, or otherwise where the driver is not required to be actively navigating the vehicle.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling the distribution within a vehicle of content that is shared from a plurality of mobile devices in the vehicle, comprising:
   (a) receiving content at the vehicle from a first mobile device located at the vehicle, wherein the content includes screen content for display by one or more display screens, and the content is received by the vehicle under control of an application executing on the first mobile device;
   (b) distributing the content within the vehicle to at least one of the displays installed in the vehicle, wherein the distribution of the content to the selected one or more displays is carried out in response to a user selection input;
   (c) receiving additional content from a second mobile device, wherein the additional content received from the second mobile device comprises a different type of content including a representation of a physical movement of the second mobile device manipulating the screen content received from the first mobile device; and
   (d) displaying the representation of the physical movement of the second mobile device on at least one of the displays using a cursor, thereby visually representing the manipulation of the screen content received from the first mobile device in response to the physical movement of the second mobile device.

2. The method of claim 1, wherein the screen content is split into two or more portions that are each sent to separate ones of the displays in the vehicle, thereby together forming an extended display area among the separate displays.

3. The method of claim 1, further comprising displaying the content via a telematics unit installed to the vehicle.

4. The method of claim 1, wherein at least one of the displays is selectively removable from the vehicle.

5. The method of claim 1, wherein at least one of the displays is permanently installed in the vehicle.

6. The method of claim 1, wherein at least one of the displays is configured to communicate wirelessly with the first mobile device.

7. The method of claim 1, wherein at least one of the displays is configured to communicate wirelessly with the telematics unit.

8. A method of controlling the distribution within a vehicle of content that is shared from a plurality of mobile devices in the vehicle, comprising:
   (a) receiving content at the vehicle from a first mobile device located at the vehicle, wherein the content includes screen content for display by one or more display screens, and the content is received by the vehicle under control of an application executing on the first mobile device;
   (b) distributing the content within the vehicle to at least one of the displays installed in the vehicle, wherein the distribution of the content to the selected one or more displays is carried out in response to a user selection input;
   (c) receiving additional content from a second mobile device, wherein the additional content received from the second mobile device comprises a different type of content including a representation of a physical movement of the second mobile device manipulating the screen content received from the first mobile device; and (d) displaying the representation of the physical movement of the second mobile device on at least one of the displays using a cursor, thereby visually representing the manipulation of the screen content received from the first mobile device in response to the physical movement of the second mobile device, wherein the screen content received from the first mobile device and the additional content received from the second mobile device are displayed via a telematics unit installed to the vehicle.

9. The method of claim 8, wherein the content received from at least one of the first mobile device and the second mobile device is provided via an application stored on the first mobile device.

10. The method of claim 8, wherein at least one of the displays is selectively removable from the vehicle.

11. A vehicle, comprising:
a plurality of displays installed in the vehicle; and
a telematics unit installed to the vehicle, the telematics unit in communication with each of the displays, the telematics unit configured to distribute content received from a plurality of mobile devices on the plurality of displays in response to a user selection input, thereby providing a connected display area amongst the plurality of displays;
wherein the telematics unit is configured to receive screen content from a first mobile device and additional content from a second mobile device, wherein the additional content received from the second mobile device comprises a different type of content including a representation of a physical movement of the second mobile device manipulating the screen content received from the first mobile device; and
wherein the telematics unit is configured to display the representation of the physical movement of the second mobile device on at least one of the displays using a cursor, thereby visually representing the manipulation of the screen content received from the first mobile device in response to the physical movement of the second mobile device.

12. The vehicle of claim 11, wherein at least one of the displays is selectively removable from the vehicle.

13. The vehicle of claim 11, wherein at least one of the displays is permanently installed in the vehicle.

* * * * *